(12) United States Patent
Wang

(10) Patent No.: US 7,317,715 B2
(45) Date of Patent: Jan. 8, 2008

(54) WIRELESS LOCAL AREA NETWORK AUTHENTICATION METHOD

(75) Inventor: Hsiao-Hung Wang, Taipei (TW)

(73) Assignee: Quanta Computer, Inc., Taoyuan Hsien (TW)

(*) Notice: Subject to any disclaimer, the term of this patent is extended or adjusted under 35 U.S.C. 154(b) by 1212 days.

(21) Appl. No.: 10/265,541

(22) Filed: Oct. 3, 2002

(65) Prior Publication Data
US 2004/0004958 A1    Jan. 8, 2004

(30) Foreign Application Priority Data
Jul. 8, 2002    (TW) ............................... 91115103 A (51) Int. Cl.
*H04L 12/66* (2006.01)
*H04M 11/00* (2006.01)

(52) U.S. Cl. .................. 370/352; 379/114.01; 455/405

(58) Field of Classification Search ........ 370/352–356; 379/114.01, 114.15–114.2; 455/405–408, 455/426.2
See application file for complete search history.

(56) References Cited

U.S. PATENT DOCUMENTS

| 6,252,869 B1 * | 6/2001 | Silverman .................... 370/352 |
| 6,961,412 B2 * | 11/2005 | Ruckart et al. .......... 379/114.2 |
| 7,058,387 B2 * | 6/2006 | Kumar et al. ................ 455/406 |

FOREIGN PATENT DOCUMENTS

| CN | 1155798 | 7/1999 |
| CN | 1319966 | 10/2001 |

* cited by examiner

*Primary Examiner*—Suhan Ni
(74) *Attorney, Agent, or Firm*—Rabin & Berdo, P.C.

(57) ABSTRACT

The present invention describes an authentication method applied in a Wireless LAN. In accordance with the present invention, it is not necessary for the user to register on the Internet supply provider (ISP) before using. In other words, when the user is in urgent need of checking network information, the user transmits the identification data and the required connection time to the account server through the safe physical connection line between the user and the account server. At the same time, the server receives the fee according to the connection time.

15 Claims, 6 Drawing Sheets

WIRELESS LOCAL AREA NETWORK AUTHENTICATION METHOD

FIELD OF THE INVENTION

The present invention is about an authentication method, and in particular about an authentication method used in a Wireless Local Area Network (WLAN). The method provides an independent charge function for the Wireless LAN service provider to actively control the user in the Wireless LAN. The user may be served real time in a service range provided by the Wireless LAN service provider and it is not necessary for the user to be a member of the Network domain before using the service.

BACKGROUND OF THE INVENTION

The Wireless LAN will become an important technology for the communication and computer industry because of rapid development in the use of the notebooks and personal digital assistants. In accordance with the configuration of a Wireless LAN, it is not necessary for the computer host to be fixed in a node as in the traditional wired networks. Under this configuration, the computer host may move anywhere freely and access the data stored in the network.

Figure 1A:
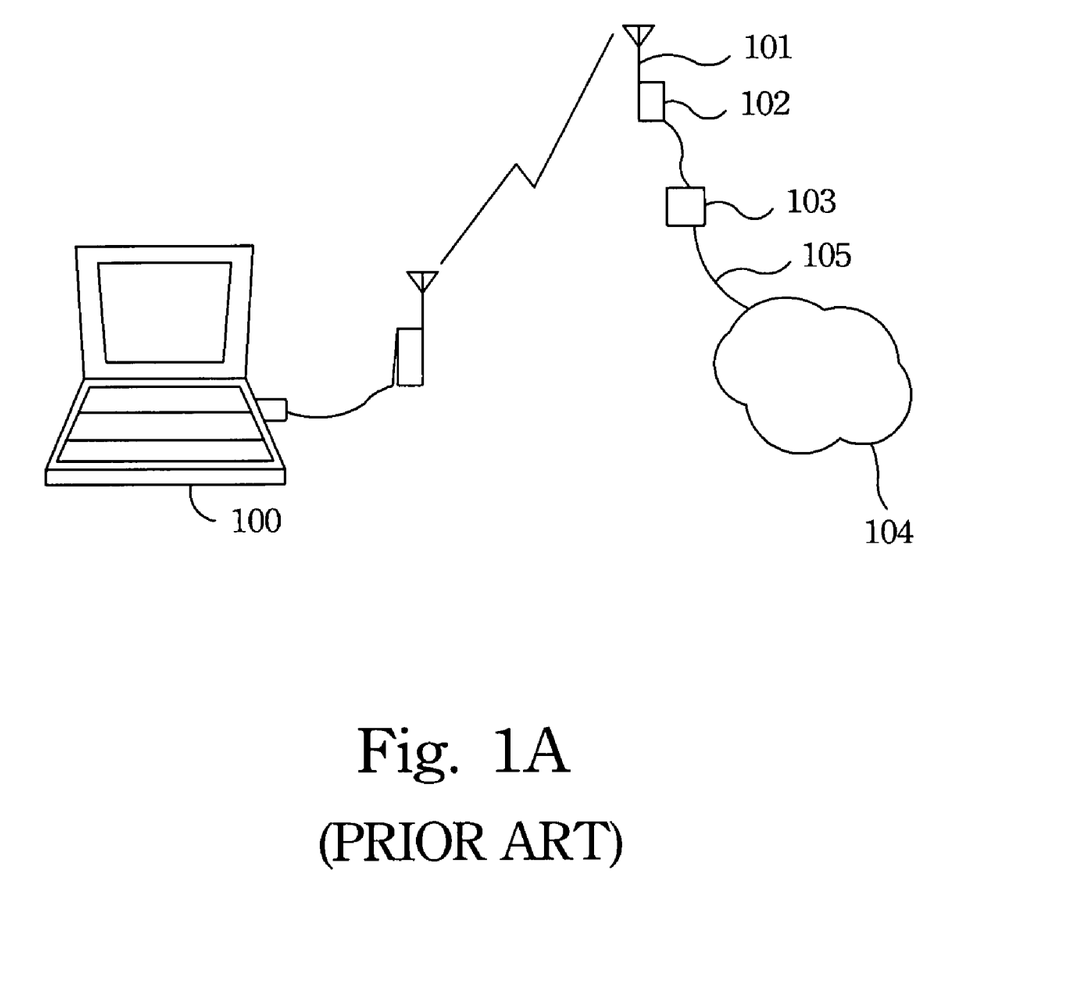
FIG. 1A shows a schematic diagram of the Infrastructure WLAN of a conventional technology.

There are two kinds of basic WLAN configuration. First one is the Infrastructure WLAN. The Infrastructure is the distributed system of the WLAN. With reference to FIG. 1A, the notebook 100 transmits the signal to the antenna 101 by radio. Then, the antenna 101 sends the received signal to the transmitter 102 to reduce the frequency of the received signal and this signal is transmitted to the access point 103. The access point 103 may transmit the received signal to local area network 104. The transmission method is to transmit the signal to the local area network 104 through the wire 105. Therefore, the notebook 100 may connect to the local area network 104 through the wire 105.

Figure 1B:
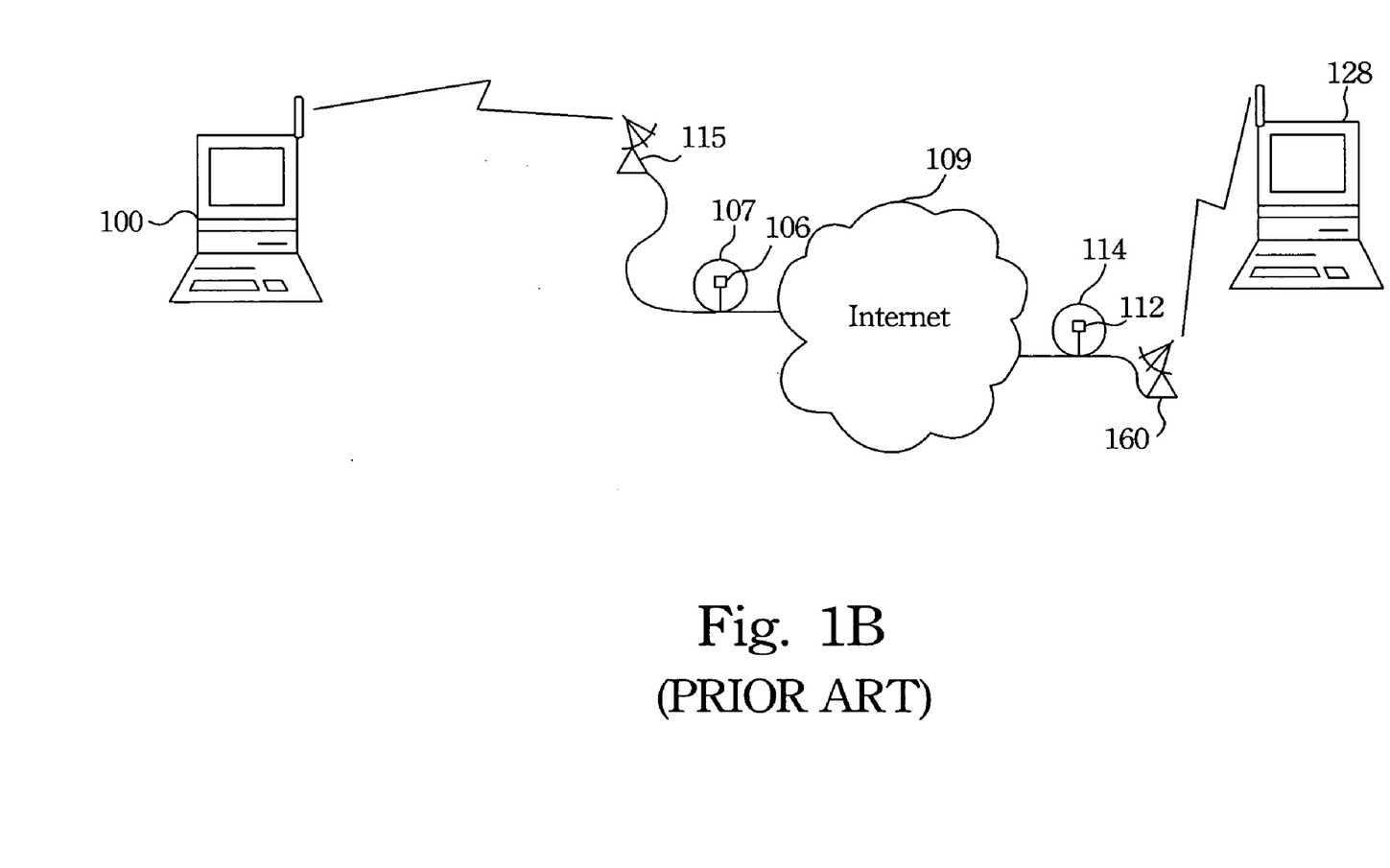
FIG. 1B shows a schematic diagram of the Ad Hoc WLAN of a conventional technology.

The other kind of basic WLAN configuration is the Ad Hoc mode. It provides a direct connection line between users. As shown in the FIG. 1B, the access point 115 receives the data sent from the personal computer 100, and this data is sent to the Internet through the gateway 116 of the local area network 107. The data reaches the gateway 112 of the local area network 114 in accordance with the IP address recorded in the data. Then, the access point 160 sends the received data to the personal computer 128 by the wireless method. Therefore, the two personal computers may communicate with each other. An Internet phone or a video conference both use this technology.

For secret data, an authentication is performed before transmitting the data. The goal of authentication is to identify the user. Such authentication may avoid communicating with the wrong user and cause the secret to be disclosed. In other words, the authentication should be performed before communication. There are two kinds of authentication method, the Wireless LAN access point authentication and the outside account server authentication. The WLAN access point authentication includes open system authentication and shared key authentication.

The open system authentication is an authentication method that does not need to perform the authentication process. The main purpose of this authentication method is to accelerate the communication process between the user and the server. In this method, the server only needs to tell the user its identification. On the other hand, the shared key authentication is about the encryption and decryption process. The characteristic of this authentication method is that both sides have a common password, a shared key, for communicating each other. The user having the shared key has to send a communication requirement to the access point of a wireless LAN before connecting to the Wireless LAN. When the access point of this Wireless LAN receives the communication requirement, it issues a challenge text to this user. When the user receives the challenge text, the user uses the shared key to encrypt this challenge text and then return the encrypted challenge text to the access point. The main purpose of this challenge text is to check whether the shared key held by the user is same as that held by the access point. When the access point receives the challenge text sent from the user, the access point of the wireless LAN decrypts the received challenge text by using the shared key held by the access point. If the decrypted challenge text is same as the challenge text originally sent by the access point, the user has the same shared key as the access point. Then, the user may connect to the Internet through the access point of the wireless LAN.

Outside account server authentication uses another account server to manage user authentication. The user registers the account number and the password number on the account server. When using the outside account server authentication method, the user first connects to the account server and then the account server checks the user's account number and the password number. If number and password check, the user may connect to the Internet through the access point.

Traditionally, many drawbacks exist in the two authentication methods. For example, it is difficult to require the users to keep the secret of the shared key in the Wireless LAN access point authentication. Therefore, somebody without permission eventually be free to use the Wireless LAN. On the other hand, the main drawback existing in the outside account server authentication is that the user must register on the account server first. Then, the permitted account number and password number are assigned to the users. Only after the user gets the permitted account number and password number may the user connect to the Internet through the access point of the Wireless LAN. This is very inconvenient for users who are in urgent need.

SUMMARY OF THE INVENTION

According to the above descriptions of the prior art, the Wireless LAN access point authentication and the outside account server authentication both have many drawbacks. Therefore, this present invention provides an improved authentication method for use on the Internet.

An account server having an independent charge function is used in the method of the present invention. If the user wants to connect to the Internet, he must finish an authentication process on this account server. First, the user needs to build a safe physical connection line between the user and the account server. Next, the user pays the connection fee to the account server according to the predetermined use time. The account server asks the user for his identification data through the previously built, safe physical connection line after the account server receives the connection fee from the use. Then, the user responds to this question and sends a connection requirement to the account server through the safe physical connection line. The account server responds to the connection requirement. Then, the user may connect to the Internet through the interface of the WLAN and also may connect to other websites.

Following are the functions of the account server of the present invention. A safe and disturbance-free communication interface exists in the account server. Therefore, the user wanting to connect with the WLAN sends identification data to the account server and pays the connection fee according to the predetermined use time to the account server through the communication interface. At this time, the account server notifies the access point to accept the connection requirement of the user and connect with the user. The account server also controls the connection time according to the payment of the user. Therefore, the account server of the present invention has the charge function and controls the connection time according to this charge.

In accordance with the WLAN authentication method of the present invention, it is not necessary for user who is in urgent need of using the Internet to complete a complicated registration process before using the WLAN service. This user may connect to the WLAN any time as long as the user is in the service range of the WLAN service. On the other hand, the provider of the WLAN service may avoid the problem, often existing in traditional technology, of free use because an account number is shared by may persons.

BRIEF DESCRIPTION OF THE DRAWINGS

The foregoing aspects and many of the attendant advantages of this invention become more readily appreciated as the same becomes better understood by reference to the following detailed description, when taken in conjunction with the accompanying drawings, wherein.

DETAILED DESCRIPTION OF THE PREFERRED EMBODIMENT

Without limiting the spirit and scope of the present invention, the WLAN authentication method proposed in the present invention is illustrated with one preferred embodiment. Skilled artisans, upon acknowledging the embodiments, can apply the authentication method of the present invention to any kind of WLAN.

In accordance with the authentication method of the present invention, the user pays the connection fee to connect with the WLAN according to the predetermined use time, which is different from the traditional method of paying a monthly fee. The provider of the WLAN service records the use time of the user to control the supply of the Wireless LAN service. The user may connect to the Wireless LAN at any time as long as the user is in the service range of the Wireless LAN service.

On the other hand, the authentication method of the present invention is different from the prior art where the user must register on the outside account server and get the authorized account number and password number before using the Wireless LAN service. Such an authentication method often needs a lot of time. It is very inconvenient for a user who is in urgent need of using the Wireless LAN service. On the other hand, for the provider of the Wireless LAN service, this kind of inconvenience causes a loss of business. Therefore, the present invention provides a Wireless LAN authentication method to solve the above problems. This present invention is not limited by the following embodiment.

The present invention provides an authentication method to whereby the provider of the Wireless LAN service records the use time of the user to control the supply of the Wireless LAN service and to allow the user to connect to the Wireless LAN any time as long as the user is in the service range of the Wireless LAN service.

Figure 2:
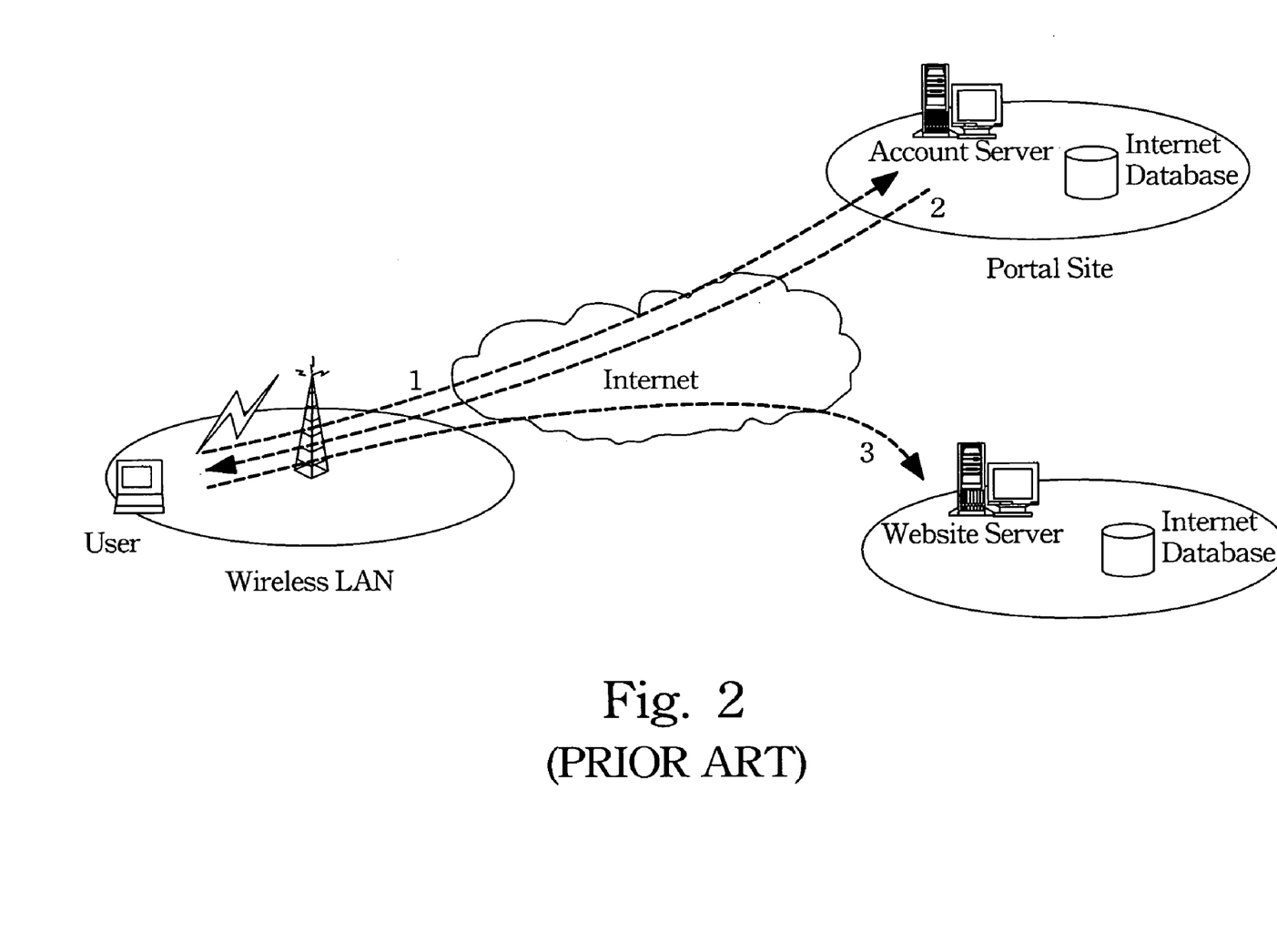
FIG. 2 shows an outside account server authentication method wherein the account server is placed on the portal site according to conventional technology.
Figure 3:
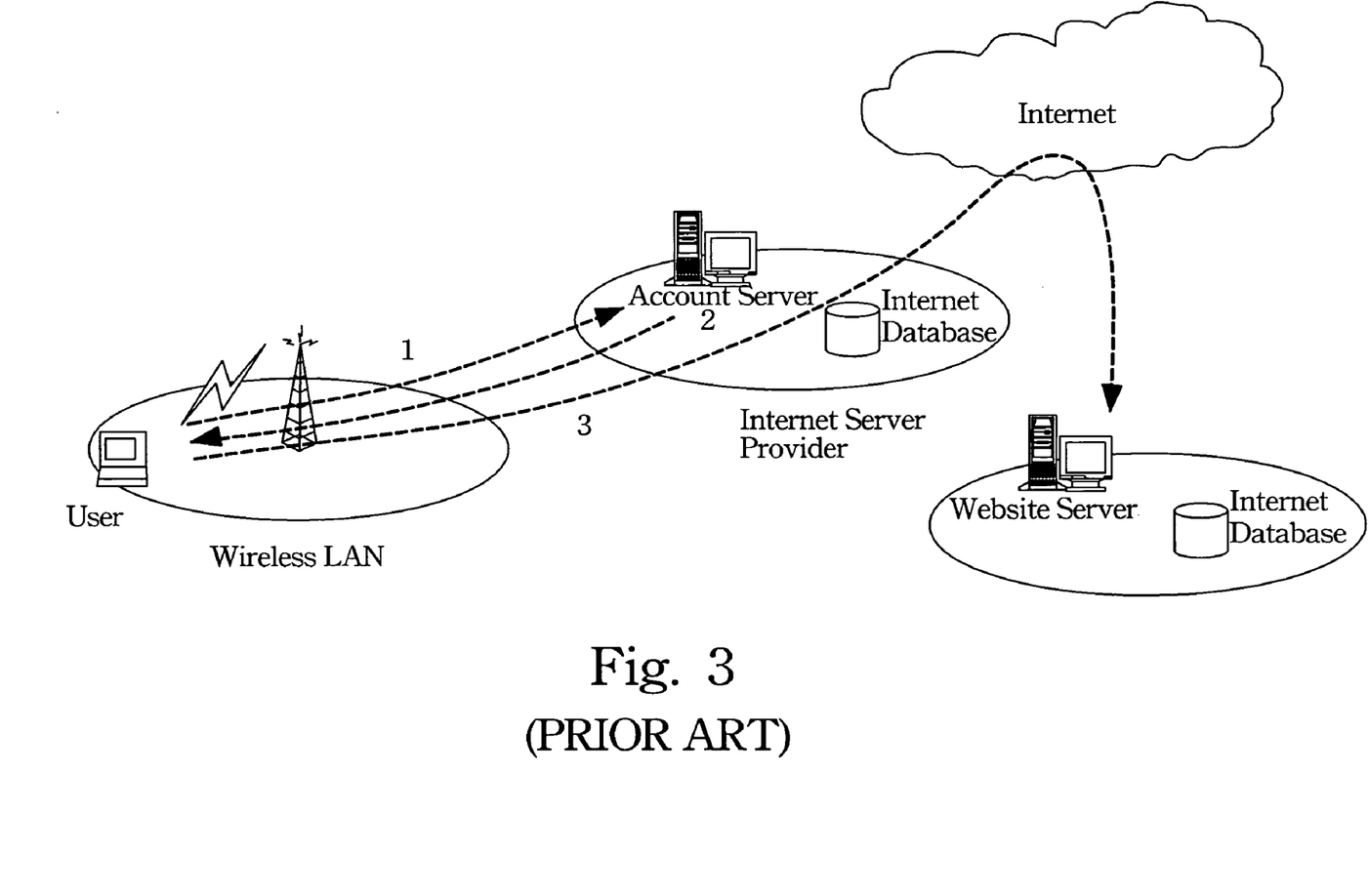
FIG. 3 shows a outside account server authentication method wherein the account server is placed on the Internet Service provider (ISP) according to conventional technology.

FIG. 2 and FIG. 3 show the traditional outside account server authentication method. In accordance with FIG. 2, the outside account server is placed on the portal site. When the user is near the access point of the Wireless LAN, the user registers on the account server of the portal site through the browser, as shown by the dotted line 1. Next, as shown by the dotted line 2, the account server checks the registered account number and the password. If the registered account number and the password are authorized, the user is permitted to connect to the Internet and may enter other web site through the Internet as shown by the dotted line 3.

FIG. 3 shows the other authentication method of the traditional account server, in which the account server is placed on the Internet Service provider (ISP). When the user is near the access point of the Wireless LAN, as shown by the dotted line 1, the user may register on the account server of the Internet Service provider through the browser. Next, as shown by the dotted line 2, the account server checks the registered account number and the password. If the registered account number and the password are authorized, the user is permitted to connect to the Internet through the Internet Service provider.

Figure 4:
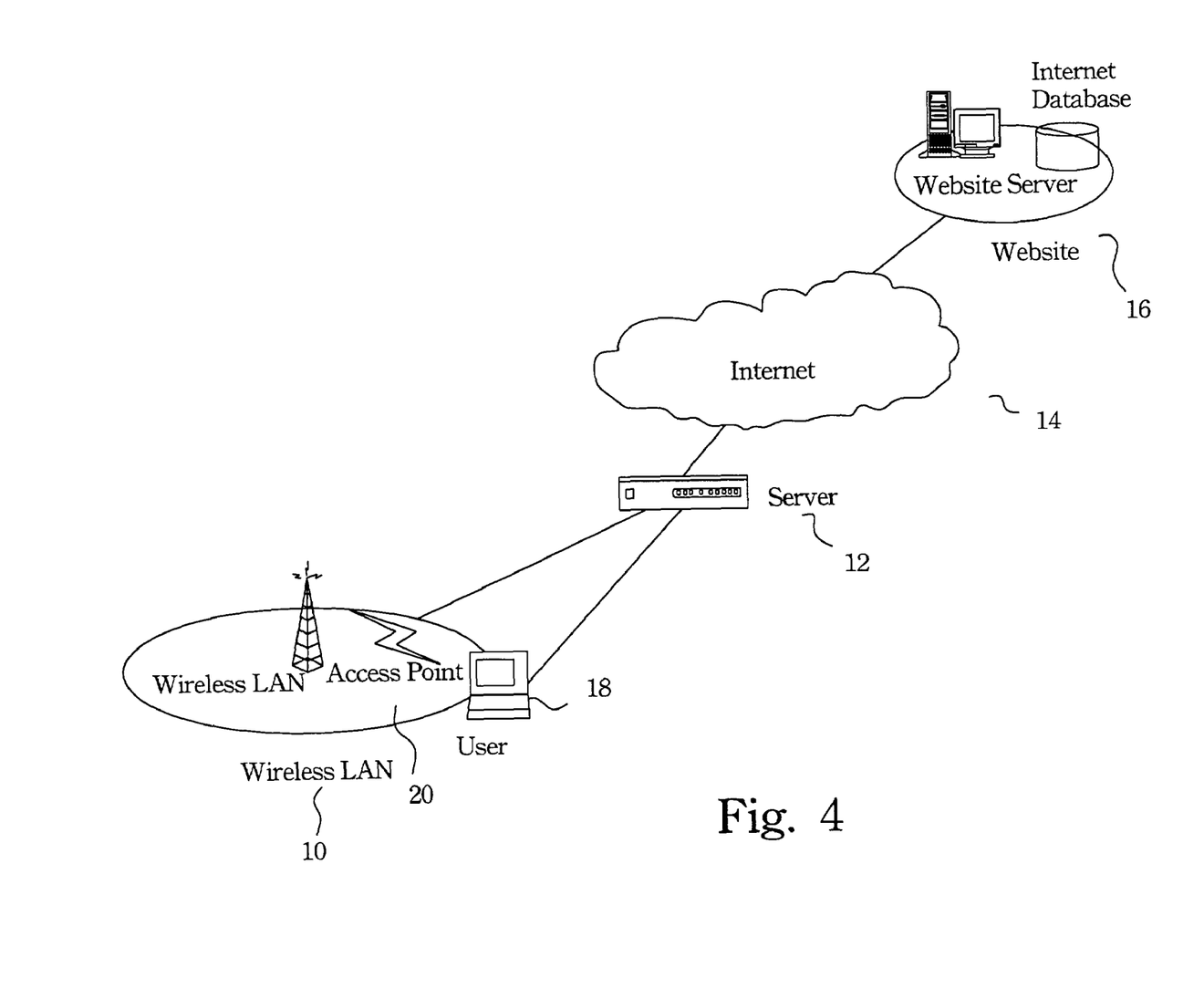
FIG. 4 shows a schematic diagram of the WLAN authentication method of the present invention.

However, the above two methods always result in a non-authorized person using the Internet for free. On the other hand, the user must register on the outside account server and get the authorized account number and password number before using the Wireless LAN service according to the authentication method of the prior art. Such authentication method needs a lot of time. It is very inconvenient for a user who is in urgent need of using the Wireless LAN service. FIG. 4 shows a schematic diagram of the Wireless LAN authentication method of the present invention, in which the configuration of the Wireless LAN 10, Internet 14 and the website 16 is same as the prior art. The main difference is the account server 12. In the prior art, the user must register on the account server and get the authorized account number and password number before using the Wireless LAN service. However, the present invention provides a new authentication method for the account server. In accordance with the present invention, it is not necessary for the user to register on the account server before using the Wireless LAN service. When the user is in urgent need of using the Wireless LAN service, the user transmits his identification data through the safe physical connection line built in real time when wanted. Then, the user is authorized to connect. Therefore, this present invention makes use of the Wireless LAN service more convenient.

Reference is again made to FIG. 4. When the user located at the client 18 is in urgent need of using the Wireless LAN service, the user first builds a safe physical connection line between the client 18 and the account server 12. An infrared ray transmission method or a serial port may be used to build this safe physical connection line. The client 18 may be a laptop or a desktop computer, or a handheld device or a personal digital assistance (PDA). After a safe physical connection line exists between the client 18 and the account server 12, the client 18 prepays the connection fee to the account server 12 according to the predetermined use time in the Wireless LAN 10. When the account server 12 receives the connection fee prepaid by the client 18, the account server 12 asks the client 18 for his or her identification data through the previously built safe physical connection line. The identification data includes the CPU serial number and media access control address (MAC address). The MAC address is the hardware address of the Wireless card at the client 18.

Then, the client 18 responds to this question from the account server 12 and sends out a connection requirement to the account server 12 through the safe physical connection line. The account server 12 responds to the connection requirement and generates an account record in the account server 12 after it receives the response from the client 18. The account record is used to record the identification data, prepaid fee and the permitted connection time according to the prepaid fee of the client 18. When the client 18 is authorized to connect, the client 18 connects to the Wireless LAN 10 through the access point and gateway of the Wireless LAN and may connect to other Websites 16 to get the needed data. The account server 12 gives the client 18 a virtual address and uses the virtual address to map a real address to communicate with the communication port.

Figure 5:
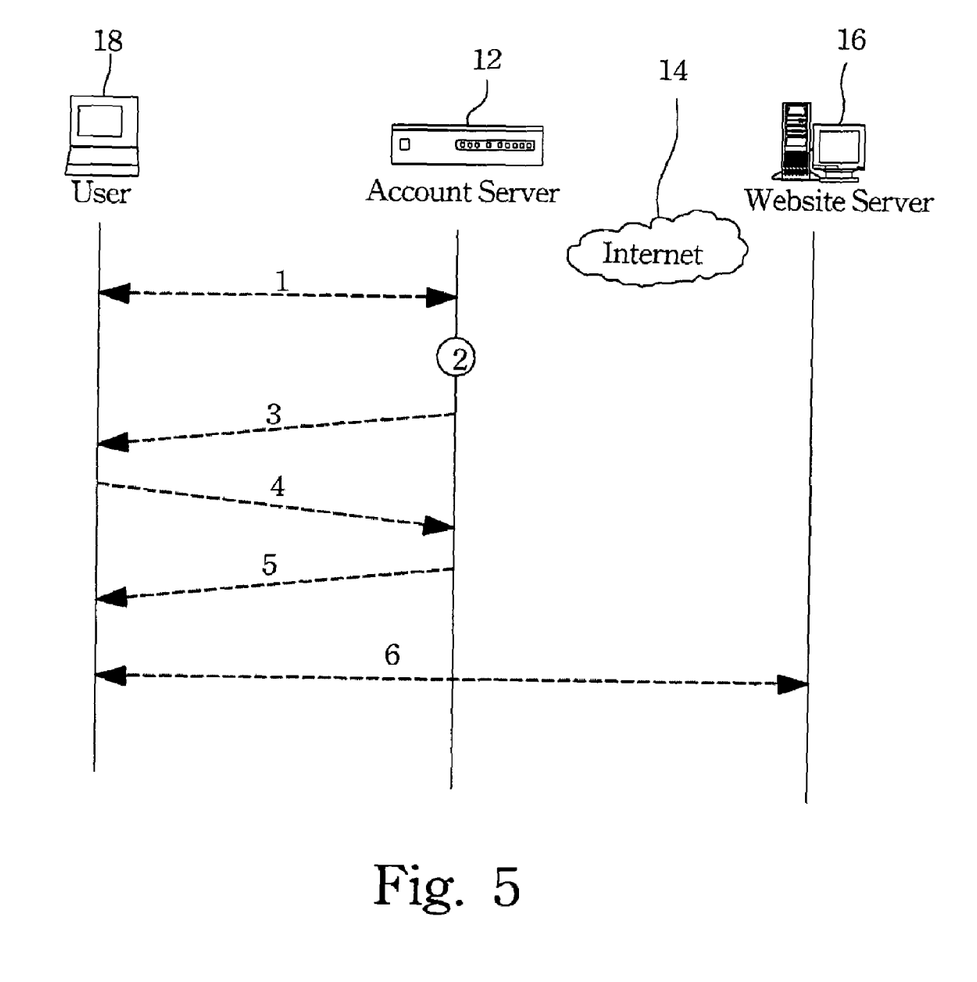
FIG. 5 shows a flow chart of the WLAN authentication method of the present invention.

Reference is made to FIG. 5, which shows the flow chart of the Wireless LAN authentication method of the present invention. The main steps of the client 18 connecting to the Wireless LAN through the account server 12 are described in the following with reference to FIG. 5, in which the dotted line respectively represents the authentication steps and the device used in the authentication steps. When the end user 18 is in urgent need of using the Wireless LAN, the user builds a safe physical connection line between the client 18 and the account server 12 in the step 1. Next, in the step 2, the client 18 prepays the connection fee to the account server 12 according to the predetermined use time in the Wireless LAN 10. In the step 3, when the account server 12 receives the connection fee prepaid by the client 18, the account server 12 asks the client 18 his or her identification data through the previously built safe physical connection line. In the step 4, the client 18 responds to this question from the account server 12 and sends out a connection requirement to the account server 12 through the safe physical connection line. Then, in step 5, the account server 12 responds to the connection requirement. For example, the account server automatically generates a pair of identification and password numbers and sends the same to the client 18. The transmission method comprises infrared ray transmission, USB, PS/2 and COM port, for example. In step 6, the client 18 may connect to the Internet 14 through the interface of the Wireless LAN and also may connect to the other Website.

In accordance with the above description, this present invention provides an account server authentication method applied in a Wireless LAN. In accordance with the present invention, it is not necessary to register with the Internet supply provider before use. In other words, when the user is in urgent need of using the Wireless LAN service to check the network information, the user may transmit his identification data to the account server through the safe physical connection line that is built in real time. Then, the user receives the authorization to connect. Therefore, this present invention will improve the convenience of the user.

The account server 12 of the present invention generates an account record to record the identification data, prepaid fee and the permitted connection time according to the prepaid fee of the client 18. On the other hand, the account server 12 may notify the gateway of the Wireless LAN to disconnect these users whose connection time has passed the permitted time and may instruct the gateway to provide the connection service for users who prepay the connection fee. Therefore, according to the account record in the account server, the gateway avoids users whose permitted connection time is over using the connection service and permits users who still have permitted connection time to transmit data.

As a whole, the account server has the functions described as follows. A communication interface is capable of maintaining a secret from others using the account server. Therefore, a user who is in urgent need of using the Wireless LAN service may transmit his or her identification data to the account server and prepay the connection fee according to the predetermined use time. Then, the account server instructs the gateway to provide the connection service for this user and controls the connection time according to the prepaid fee. Therefore, in accordance with the Wireless LAN authentication method of the present invention, it is not necessary for the user who is in urgent need of using the Internet to pass the complicated registration process before using the Wireless LAN service. This user may connect to the Wireless LAN at any time as long as the user is in the service range of the Wireless LAN service. On the other hand, the provider of the Wireless LAN service may avoid the common problem of free use, often existing in traditional technology, because an account number is shared by many persons.

As is understood by a person skilled in the art, the foregoing preferred embodiments of the present invention are illustrative of the present invention rather than limiting of the present invention. They are intended to cover various modifications and similar arrangements included within the spirit and scope of the appended claims, the scope of which should be accorded the broadest interpretation so as to encompass all such modifications and similar structure.

What is claimed is:

1. An authentication method applied in a Wireless Local Area Network (WLAN), comprising:
   providing a server and a client;
   building a safe connection line between said server and said client;
   prepaying a connection fee to said server by said client according to a predetermined connection time of said client;
   sending a question regarding identification data of said client from said server through said safe connection line after said server receives said connection fee, wherein said identification data comprises a CPU serial number and media control address;
   responding to said question by said client through said safe connection line; and
   connecting an Internet from said client through said Wireless LAN after said server confirms said connection requirement.

2. The authentication method according to claim 1, wherein said client includes a laptop computer, a notebook computer, a handheld device and a personal digital assistant (PDA).

3. The authentication method according to claim 1, wherein building a safe connection line uses an infrared ray transmission.

4. The authentication method according to claim 1, wherein building a safe connection line uses a serial port.

5. The authentication method according to claim 1, wherein an account record is generated after said server confirms said connection requirement, wherein said account record includes the data of the identification data of said client, said connection fee prepaid by said client and a permitted connection time according to said connection fee.

6. The authentication method according to claim 5, wherein said server connects to said client according said permitted connection time.

7. The authentication method according to claim 1, wherein said server disconnects said client when said permitted connection time is over.

8. The authentication method according to claim 1, wherein said server controls a gateway to connect with said client after said server confirms said connection requirement and before said client connects the Internet.

9. An authentication system applied in a Wireless LAN, comprising:
 a server for account management;
 a client prepaying a connection fee to said server according to a predetermined connection time of said client;
 a safe connection line existing between said client and said server, wherein said server asks said client for an identification data through said safe connection line and said client responds and sends a connection requirement to said server through said safe connection line, wherein said identification data comprises a CPU serial number and media control address; and
 a gateway controlling the connection line between said client and said server according to an account management record stored in said server.

10. The authentication system according to claim 9, wherein said client includes a laptop computer, a notebook computer, a handheld device and a personal digital assistance.

11. The authentication system according to claim 9, wherein said safe connection line includes an infrared ray communication.

12. The authentication system according to claim 9, wherein said safe connection line includes a serial port.

13. The authentication system according to claim 9, wherein said account management record includes the data of the identification data of said client, a connection fee prepaid by said client and a permitted connection time according to said connection fee.

14. The authentication system according to claim 9, wherein said server connects to said client according to said permitted connection time.

15. The authentication system according to claim 9, wherein said server disconnects said client when said permitted connection time is over.

* * * * *